UNITED STATES PATENT OFFICE.

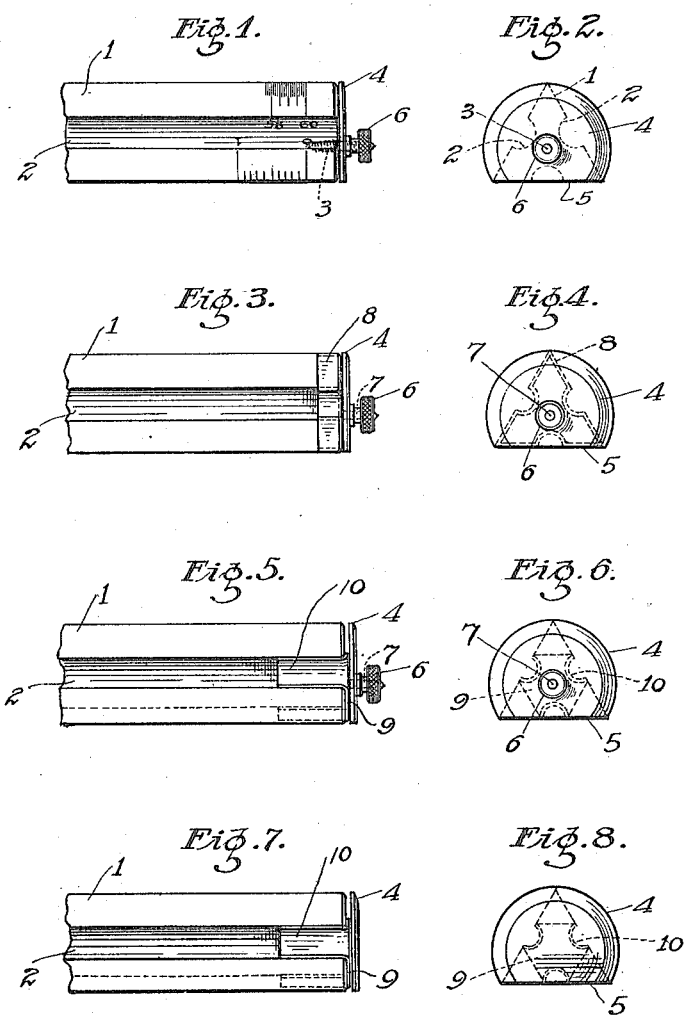

JOHN GORDON SPARKES, OF BIRMINGHAM, ALABAMA, ASSIGNOR TO KEUFFEL & ESSER COMPANY, OF HOBOKEN, NEW JERSEY, A CORPORATION OF NEW JERSEY.

GUARD FOR DRAFTSMEN'S SCALES.

1,213,781.  Specification of Letters Patent.  Patented Jan. 23, 1917.

Application filed February 21, 1916. Serial No. 79,653.

*To all whom it may concern:*

Be it known that I, JOHN GORDON SPARKES, a citizen of the United States of America, residing at Birmingham, in the county of Jefferson and State of Alabama, have invented certain new and useful Improvements in Guards for Draftsmen's Scales, of which the following is a specification.

My invention relates to a guard adapted for use on polygonal drafting scales for the purpose of saving time in operation and for positively preventing accidental use of the wrong scale index.

My invention is equally adapted for use on the triangular scale rules and my object is to design a guard that will present the least possible interference to the draftsman in the use of the scale and be as little conspicuous as possible.

In its preferred form the guard is a curved or round plate having a segment cut away so that when it is attached to the scale it will project beyond all but one of the side or index bearing faces of the scale and hold them off of the drafting board by the edge of the guard and will thus warn the draftsman against the use of the wrong scale index. Moreover, the curved guard can be adapted to permit the draftsman to roll his scale under his hand along the board until the cut away portion thereof comes into bottom-most position and permits one side face of the scale to lie flat on the board, in which position the desired scale index will be in position for use, this rolling of the scale making it very quick and easy to adjust it to present the desired scale index almost without conscious effort on the part of the draftsman. The guard may be attached in any suitable manner preferably at the end of the scale and it may have any suitable shape which will prevent more than one face of the scale lying flat on the board.

As illustrative of a variety of embodiments of my invention, reference is made to the accompanying drawings, in which:—

Figures 1 and 2 show side and end views of a circular guard pivoted to turn on a stud in the end of the scale; Figs. 3 and 4 are similar views showing the guard pivoted to a ferrule which fits over the end of the scale; Figs. 5 and 6 are similar views of the guard attached to a clip, the arms of which interlock in the grooves in the face of the scale; and Figs. 7 and 8 show the guard rigidly attached to a clip which engages the end of the scale.

Similar reference numerals refer to similar parts throughout the drawings.

In the figures I have illustrated a triangular drafting scale 1 having longitudinal grooves 2 interposed between the index bearing surfaces of each face. As illustrated in Figs. 1 and 2, a spud or screw 3 is screwed or made fast in the center of an end of the scale and a guard 4 is formed by a circular plate having a segment thereof cut away to form a flat surface 5. This guard is pivotally mounted at its center on the spud 3 and is adapted to turn thereon and to be clamped in position by a thumb nut 6 screwed on the outer end of the spud. It will be noted by reference to Fig. 2 that the flat face 5 defines a cord having a length equal to the width of a side face of the scale and that the radius of the circular guard is equal to the distance from the center of the triangle to the apices thereof. This is the preferred type of the guard as it lends itself most conveniently for use on the scale, as will be seen by reference to Fig. 2; will permit the scale to be rolled on the curved edge of the guard until the flat face 5 thereof rests on the board and moreover the curved surface of the guard will support all but one of the scale faces sufficiently from the board to prevent the draftsman failing to take notice that the scale is not resting firmly and flatly upon the board.

In Figs. 3 and 4 instead of mounting the guard upon a spud inserted in the end of the scale, I pivot it on a short stud axis 7 mounted on a ferrule 8 shaped to conform to the cross sectional contour of the scale and to fit snugly over the end thereof. The guard 4 is free to turn on the stud 7 and is clamped in position by the thumb nut 6.

In Figs. 5 and 6 the stud 7 instead of being mounted on a ferrule is mounted on a clip 9 formed by a metal plate having concavo-convex clamp arms 10 bent at right angles to the plate and disposed and shaped to fit down into the grooves 2 in the side faces of the scale. The guard 4 is mounted on this stud 7 and held by the thumb nut 6 as in the construction shown in Fig. 3.

In Figs. 7 and 8 the guard is rigidly attached to the clip 9 and when it is desired to change the position of the guard the clip is slipped off and turned to present the flat guard face 5 opposite the scale face desired and then remounted on the end of the scale.

With all of the constructions I have shown the curved guard 4 as this is preferred for the reason that the scale can be rolled into operating position, but it will be obvious that the shape of the guard can be modified and that it will function sufficiently in the manner desired if it presents projecting surfaces which will prevent any but a predetermined face of the scale from resting flat on the drafting board.

Having selected the scale which will be used and set the guard accordingly, the draftsman can readily use the scale without being conscious of the guard except when he seeks by oversight to use the wrong scale index.

Having thus described my invention, what I claim as new and desire to secure by Letters Patent, is:—

1. A guard for polygonal scales having a rounded edge adapted to project beyond all but one of the flat faces of a scale and forming a continuous rolling support for the latter in all but one position, and means to mount the guard on a scale.

2. A guard for polygonal scales formed by a circular plate having a segment removed therefrom, and means at the center of the plate for attaching it to the end of a scale.

3. A guard for polygonal scales formed by a circular plate having a segment removed therefrom, and means at the center of the plate for attaching it to the end of a scale, said guard having a radius not less than the distance from the center to the corner edges of the scale on which it is adapted to be mounted.

4. A scale guard formed by a flat rounded plate having a segmental portion cut therefrom, and a center pivot pin adapted for attaching it to the end of a scale.

5. A scale guard formed by a plate having portions adapted to project substantially beyond all but one of the index bearing sides of a polygonal scale to which it is adapted to be attached, and means to mount said plate on the scale in a plane at right angles to the long axis of the latter.

6. The combination with a polygonal drafting scale, of a circular guard plate mounted at an end thereof and having a flattened surface, said surface when opposite one index bearing side of the scale leaving no projection beyond the plane of such side, and the curved edge of the guard forming a rolling support for the other sides of the scale.

7. The combination with a polygonal scale, of a circular guard plate, means to pivotally mount said guard at the end of the scale with its center substantially coincident with the long axis of the scale and with the side faces of the scale subtending chords thereon, said plate having a segment removed from its periphery sufficient in extent to leave no substantial projection of the guard beyond one index bearing side of the scale, and means to clamp said guard in position on the scale with its cut away portion opposite any desired index bearing surface.

8. The combination with a polygonal drafting scale, of means to mount a guard on the end thereof, said means comprising a detachable scale engaging means and a pivotal support, a guard plate mounted to turn on said support in a plane at right angles to the long axis of the scale and having portions adapted to project beyond the plane of all but one of the index surfaces of the scale, and clamp means to set the guard in different operating positions on the scale, substantially as described.

In testimony whereof I affix my signature.

JOHN GORDON SPARKES.

Witness:
  NOMIE WELSH.

Copies of this patent may be obtained for five cents each, by addressing the "Commissioner of Patents, Washington, D. C."